May 11, 1937.　　W. C. HARPER　　2,080,205
STAND
Filed March 31, 1936
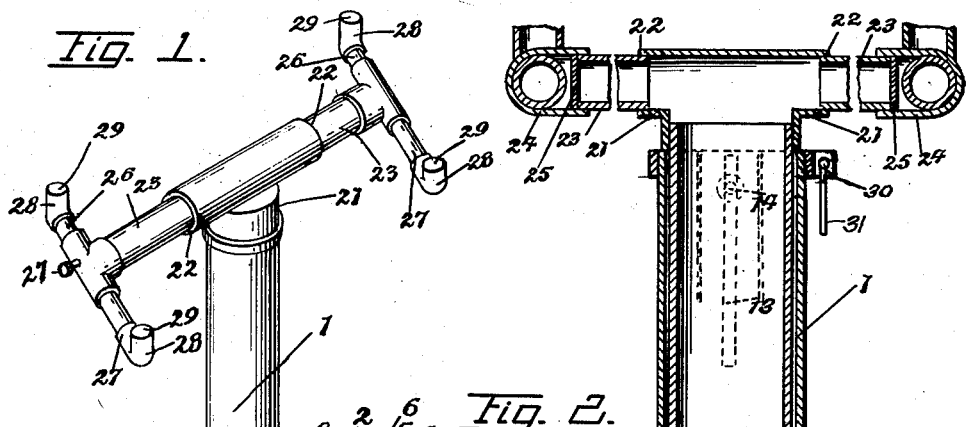
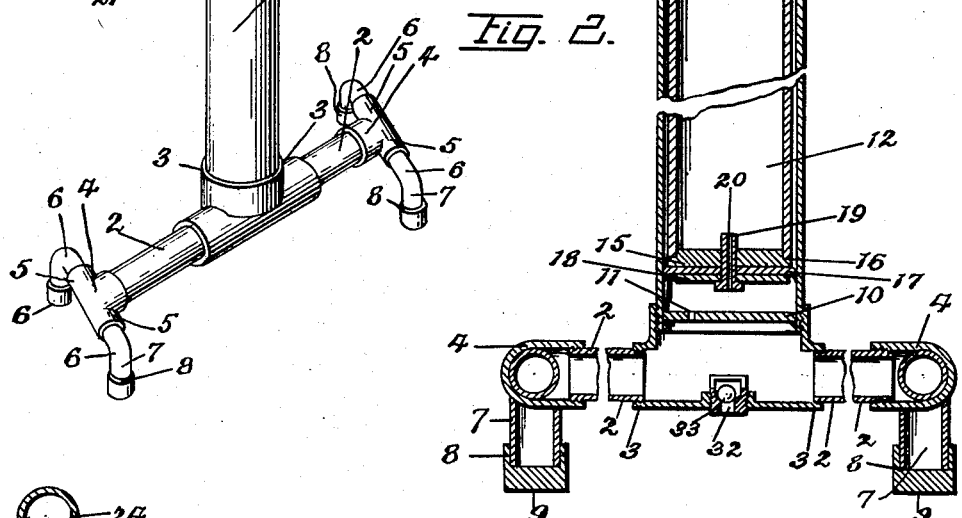
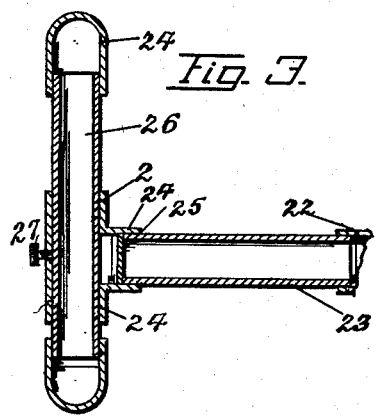
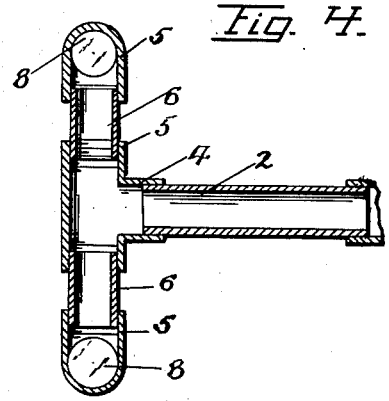
Inventor
Worthy C. Harper
By
Attorney Patented May 11, 1937

2,080,205

UNITED STATES PATENT OFFICE 2,080,205

STAND

Worthy C. Harper, Caldwell, Ohio

Application March 31, 1936, Serial No. 71,938

3 Claims. (Cl. 254—93)

This invention is directed to an improvement in supporting stands designed to support and substantially counterbalance the weight of an object to thereby permit the stand with the object thereon to be adjusted as to height with the minimum of exertion on the part of the operator.

In the use of some apparatus, as for example apparatus for treating the eyes and in the use of which the patient looks into the apparatus during treatment, it is continually necessary to adjust the instrument to the particular eye level of each patient, and where, as is usually the case, the apparatus is one of considerable weight, the muscular effort necessary to physically adjust the height of the instrument for each new patient is unnecessarily fatiguing to the operator.

The present invention is, therefore, designed with a view to avoiding, to a very material degree, the effort on the part of the operator necessary to adjust the instrument to a particular desired level or height and, while permitting simple and accurate adjustment as to height, requires but a slight effort on the part of the operator to secure the desired result.

The primary object of the present invention is the provision of a stand constructed with a view to providing for a pneumatic counterbalance of the weight of the article placed on the stand, together with means whereby the movable element of the stand may be held against displacement at will, whereby, in elevating or lowering the stand to adjust the apparatus to the requisite height, a slight effort on the part of the operator is all that is required, as the weight of the apparatus per se is substantially counterbalanced.

The invention is illustrated in the accompanying drawing, in which:

Figure 1 is a perspective view of the stand.

Figure 2 is an enlarged broken vertical sectional view of the stand.

Figure 3 is a transverse section through the apparatus supporting element of the stand.

Figure 4 is a transverse section through the base of the stand.

The improved stand comprises a main hollow column 1 of appropriate height and diameter provided at the lower end with hollow lateral branches 2 in open communication with the interior of the column through a T connection 3. The ends of the branches 2 are provided with T connections 4, the branches 5 of which receive hollow pipe extensions 6 disposed in alignment at right angles to the branches 2 and terminating in L-connections 7, the down-turned branches of which are closed by threaded plugs 8 extended to form surface engaging elements 9. The connection between the parts described is preferably though not necessarily a threaded one and it is to be particularly noted that the entire base support of the stand is hollow and in open communication with the column 1, being closed against air escape by the plugs 8.

The extreme lower end of the column 1 is provided with a plate 10, preferably welded in place to close the lower end of the column except for a bleed opening 11 formed in the plate.

A secondary or movable hollow column 12 is slidably mounted in the main or fixed column 1. The wall of column 12 is formed with a longitudinally ranging groove or channel 13 engaged by the end of a set-screw 14 passing through the fixed column 1 to prevent rotary movement of the movable column within the fixed column and limit vertical play of the movable column.

The lower end of the movable column is provided with a plate 15 recessed at its edge, as at 16, to receive the lower end of the movable column and securely welded or otherwise fixed to the movable column. Underlying the plate 15 is a flexible disk 17, the material and diameter of which is such as to utilize the disk as a seal between the movable column and the fixed column.

The flexible disk or sealing cup 17 is secured in place by an inflexible washer 18 secured by a set-screw 19 passing through the washer 18, disk 17 and taking into the plate 15. This set-screw is longitudinally perforated or formed with a relatively small bore 20 which thus establishes communication between the fixed column 1 and the hollow portion of the base and the interior of the movable column 12.

The upper end of the movable column 12 is provided with a T connection 21, to the lateral branches 22 of which are secured hollow arms 23 of appropriate length. The outer ends of the arms 23 are provided with T connections 24, which T connections are formed with an interior web 25 serving to close the hollow arms at their outer ends against air leakage. Branch arms 26 slide through the T connections 24, being held in adjusted positions by set-screws 27. The branch arms are terminally provided with L-connections 28, the free ends of which turn upwardly and are preferably terminally provided with appropriate elements 29 on which the apparatus to be supported rests.

The upper end of the fixed column 1 is longitudinally slotted to provide so-called spring sections to receive the holding element in the form of a clamping ring engaging the outside of the fixed column and appropriately divided so that it may be clamped through the medium of a set-screw 30. The clamping ring tends to compress the movable sections formed by vertically dividing the upper end of the fixed column tightly onto the movable column to hold the latter in adjusted position. The set-screw is provided with a handle 31 through the medium of which the control of the set-screw is readily provided. The lower end of the T connection 3 is formed with an inwardly opening valve 32 extended through the T as a nipple 33 to provide for the connection thereto of a source of air under pressure.

The respective arms 26 are movable on the T connections 24. They may be moved so as to project for different relative lengths beyond the T connections 24, so that the apparatus supported may be extended farther to one side or the other of the stand by properly disposing the long and short branch arms in an obvious manner.

The apparatus to be supported is placed upon the upper support involving the T connection 21, hollow arms 23, T connections 24 and branch arms 26 and 27, the apparatus proper resting upon the elements 29 which may be and preferably are formed to prevent slipping of the apparatus. Air under pressure, as from a hand or foot pump for example, is introduced into the stand through the valve 32.

It is to be noted that, as previously stated, substantially the entire base of the stand and the major portion of the upper supporting end of the stand are hollow and in open communication with the main or fixed column 1. This entire area is filled with air under pressure, the volume and pressure of which are increased until the weight of the apparatus on the movable element of the stand is counterbalanced. That is to say, the pressure medium is such as to tend to cause an upward movement of the apparatus. Through the medium of the screw 30, the movable column 12 may, of course, be fixed at any relative height with respect to the fixed column 1.

With the weight of the apparatus counterbalanced by the volume and pressure of air within the stand, it is of course apparent that in lowering or raising the apparatus to accommodate successive uses of such apparatus, it is only necessary to loosen the set-screw 30 and move the apparatus to the desired position and again tighten the set-screw to hold it in that position. Due to the counterbalance of the weight of the apparatus, the effort of the operator in either raising or lowering the apparatus requires a relatively slight effort on his part and the fatigue incident to a continual changing of the height of the apparatus during the treatment of a number of successive patients, where in such changing the operator has to handle the entire weight of the apparatus, is entirely avoided.

If for any reason the set-screw 30 should become loose during the use of the apparatus and there should be a tendency of the apparatus to move downwardly, any shock or sudden movement incident to this casual loosening of the set-screw is avoided by reason of the fact that the area of the fixed column 1 below the sealing disk or cup washer 17 of the movable column 12 is opened to air escape only through the relatively small bleed openings 11 and 20 and thus, under such accidental movement, the apparatus cannot move rapidly and therefore cannot be subjected to any shock which might otherwise be presented in the sudden stop of the movable column at its downward limit of movement through air leakage and accidental release of the set-screw 30.

As previously stated, substantially the full area of the supporting base of the stand and a considerable portion of the supporting member of the stand will be hollow and open to the counterbalancing air. This provides a relatively large volume of air which tends to a more effective operation and longer range of adjustment and materially reduces liability of ineffectiveness due to air leakage.

Of course, it is understood that by manually operating the valve 32 through any instrument introduced through the nipple, air pressure within the stand may be relieved in order to permit the stand to occupy its minimum size when not required for use.

As described and shown, it is apparent that the stand as a whole may be and preferably is made up of conventional pipe sections of appropriate diameter and length, and while this is preferred as a matter of economy, it is nevertheless apparent that the stand may be constructed of specially formed parts and of any appropriate and serviceable material.

While the stand is described primarily for use in connection with eye treating apparatus, in the use of which with successive patients continual adjustment of the height of the apparatus is necessary, it is nevertheless apparent that the invention contemplates the use of the stand for any and all purposes to which it may be applied.

What is claimed to be new is:

1. A stand including a hollow base, a fixed column rising from the base, a plate formed with a bleed opening otherwise sealing the fixed column against the base, a movable column movable in the fixed column, means carried by the lower end of the movable column arranged for sealing connection with the fixed column, said means providing a restricted communication between the fixed column above the plate and the movable column, an article support at the upper end of the movable column, and mechanically operated means at the upper end of the fixed column for securing the movable column against movement, and means for maintaining air under pressure constantly in the movable column above the restricted communication and in the fixed column below the restricted communication.

2. A stand including a hollow base, a fixed column rising from the base, a plate formed with a bleed opening otherwise sealing the fixed column against the base, a movable column movable in the fixed column, means carried by the lower end of the movable column arranged for sealing connection with the fixed column, said means providing a restricted communication between the fixed column above the plate and the movable column, an article support at the upper end of the movable column, and mechanically operated means at the upper end of the fixed column for securing the movable column against movement, said article support including a hollow branch arranged transversely of the movable column and in open communication therewith and spaced parallel arms carried by the ends of the hollow branch and disposed at right angles thereto, and means in the base to admit air under pressure, said means closing against air escape and thereby serving to maintain a constant volume of air under pressure in the movable column, in the fixed column below the movable column, and in the hollow branch of the vertical support, to insure a normal resistance against movement of the article support in the downward direction while permitting the movable column and article support to be moved in either direction relative to the fixed column with consequent variation in internal air pressure, with the columns held in their relative positions under variations of air pressure by the mechanically operated means.

3. A construction as defined in claim 2, wherein the hollow branch is terminally provided with T-form elements in which the arms are adjustable.

WORTHY C. HARPER.